United States Patent [19]

Byer et al.

[11] Patent Number: 5,077,087

[45] Date of Patent: Dec. 31, 1991

[54] METHOD OF CLADDING SINGLE CRYSTAL OPTICAL FIBER

[75] Inventors: Robert L. Byer, Stanford; Amado Cordova, Woodland Hills; Michael Digonnet, Palo Alto; Martin Fejer, Menlo Park; Celestino Gaeta, Thousand Oaks; Herbert J. Shaw, Stanford, all of Calif.; Shoichi Sudo, Atsugi, Japan

[73] Assignee: The Board of Trustees of the Leland Stanford Junior Univ., Stanford, Calif.

[21] Appl. No.: 491,442

[22] Filed: Feb. 28, 1990

Related U.S. Application Data

[62] Division of Ser. No. 186,045, Apr. 25, 1988, Pat. No. 5,037,181.

[51] Int. Cl.$^5$ .............................................. B05D 1/18
[52] U.S. Cl. ............................. 427/163; 427/443.2; 65/3.11; 65/3.2; 65/60.53
[58] Field of Search ................. 65/3.11, 3.2, 11.1, 65/12, 60.53, 66, 83; 350/96.29, 96.3, 96.34; 427/164, 443.2, 163

[56] References Cited

U.S. PATENT DOCUMENTS

| | | | |
|---|---|---|---|
| 3,922,622 | 11/1975 | Boyd et al. | 310/9.5 |
| 4,039,260 | 8/1977 | Redman | 356/350 |
| 4,077,699 | 3/1978 | Dyott et al. | 350/96.34 |
| 4,181,515 | 1/1980 | Dyott et al. | 350/96.14 |
| 4,251,570 | 2/1981 | Zook | 427/443.2 |
| 4,428,646 | 1/1984 | Lighty | 65/3.11 |
| 4,521,073 | 6/1985 | Murakami et al. | 350/96.3 |
| 4,557,551 | 12/1985 | Dyott | 350/96.3 |
| 4,613,521 | 9/1986 | Smith | 427/164 |
| 4,717,589 | 1/1988 | Ishikawa et al. | 427/443.2 |
| 4,766,954 | 8/1988 | Bierlein et al. | 427/164 |

FOREIGN PATENT DOCUMENTS 1-257802 10/1989 Japan.

OTHER PUBLICATIONS

Burrus, et al., Room Temperature 1.3 um C.W. operation of a glass clad Nd:Y.A.G. single-crystal Fibre Laser, Electronics Letters 10/28/76 pp. 600-602.

*Primary Examiner*—Richard V. Fisher
*Assistant Examiner*—John J. Bruckner

[57] ABSTRACT

Methods and apparatus are shown for cladding grown single crystal optical fibers. Neodymium YAG fibers are clad with a high index glass, either melted around the fiber in a trough or extruded over the fiber surface. Lithium niobate fibers are clad through an impregnation process. The lithium niobate fiber is first coated with magnesium oxide and then heated to a temperature and for a time sufficient for the magnesium oxide dopant material to diffuse into the fiber. The dopant lowers the intrinsic refractive indices of the fiber material around its circumference, creating a cladding region around the fiber core. Single crystal fibers clad by these methods and combined with suitable pumping means or with deposited electrodes provide low-loss single mode optical components useful for amplification, electro-optical effects and acousto-optical effects.

8 Claims, 6 Drawing Sheets

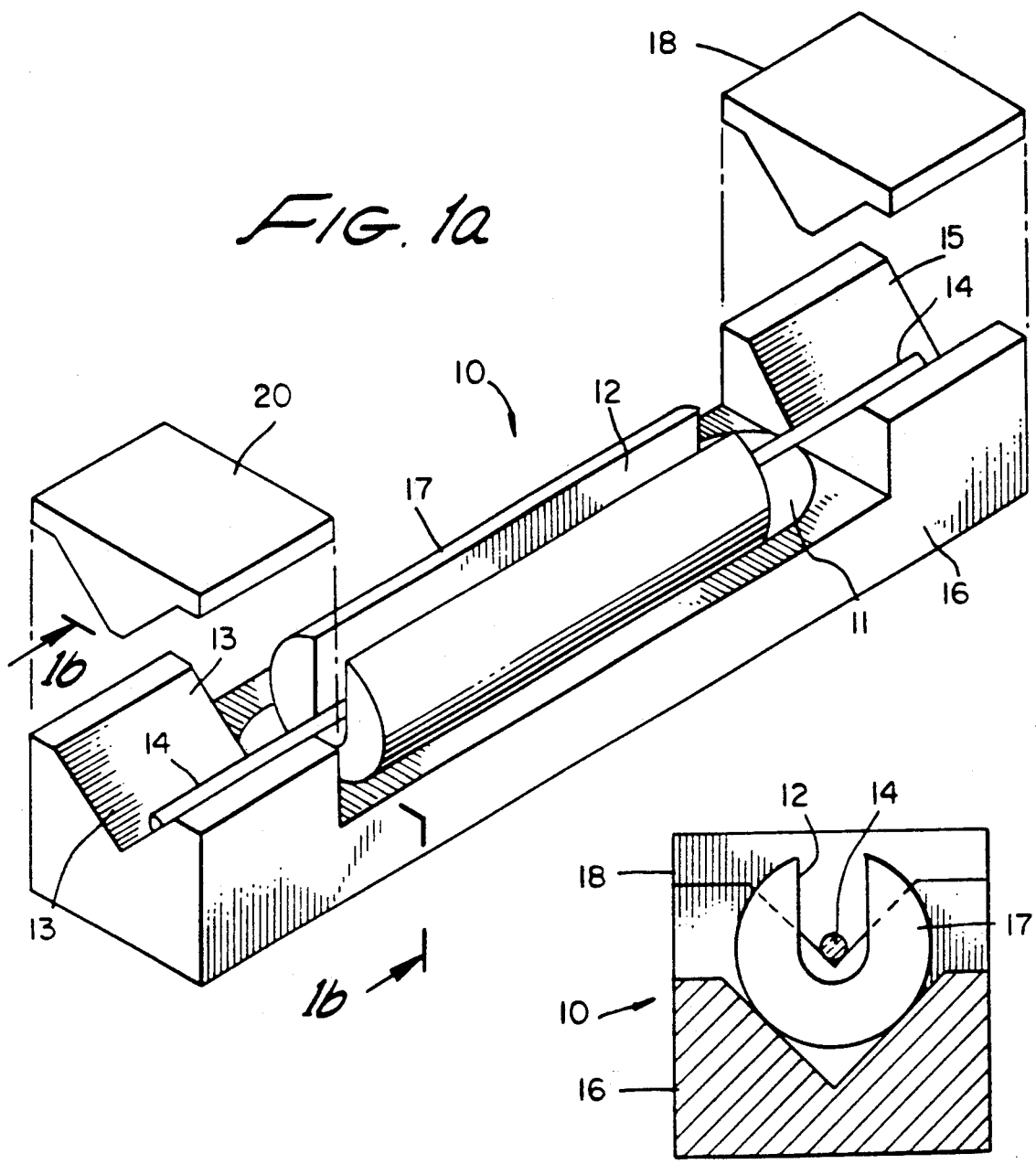
FIG. 1a
FIG. 1b
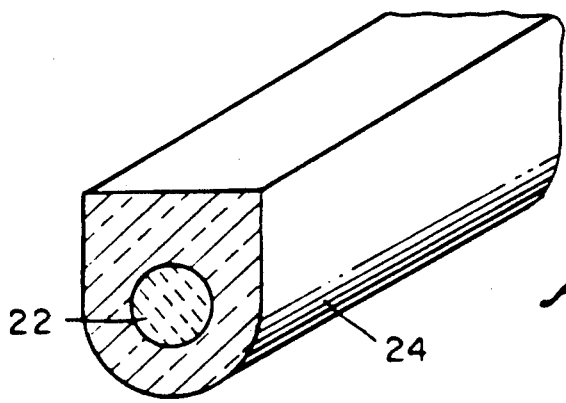
FIG. 2a

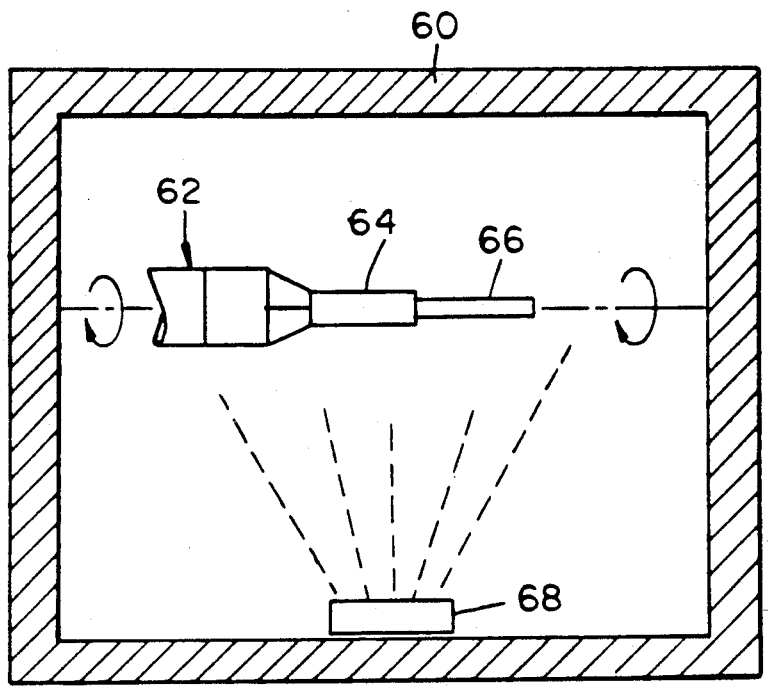
FIG. 5
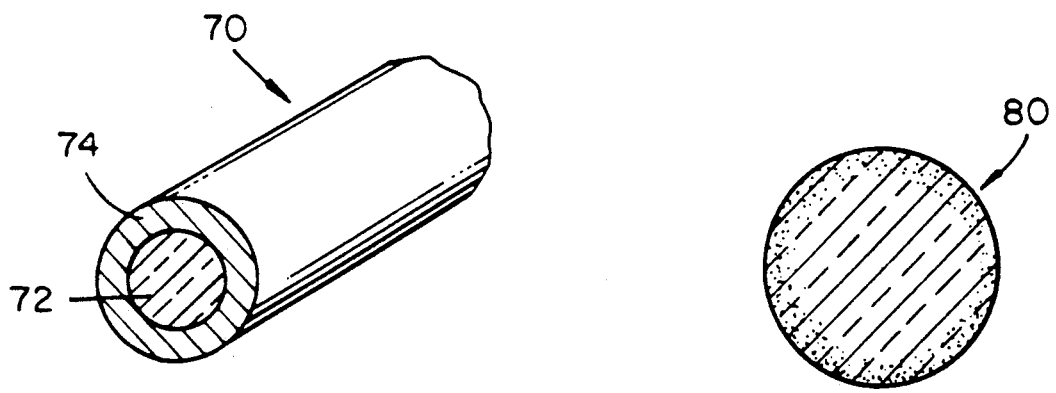
FIG. 6
FIG. 7a
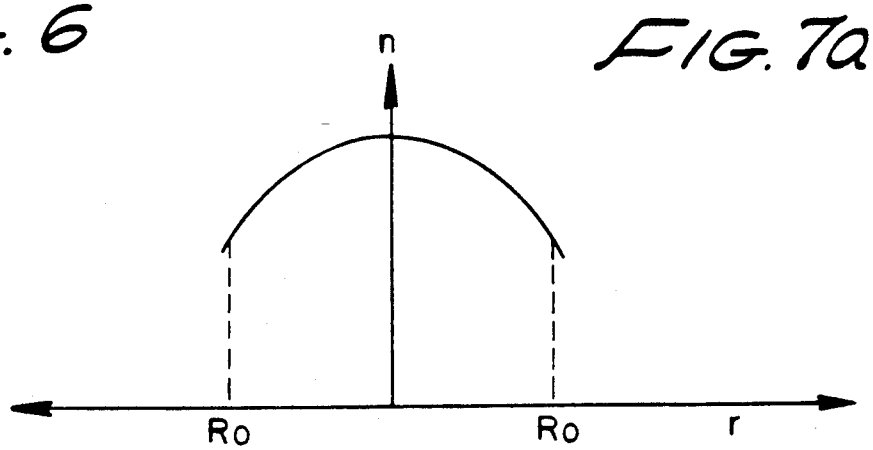
FIG. 7b

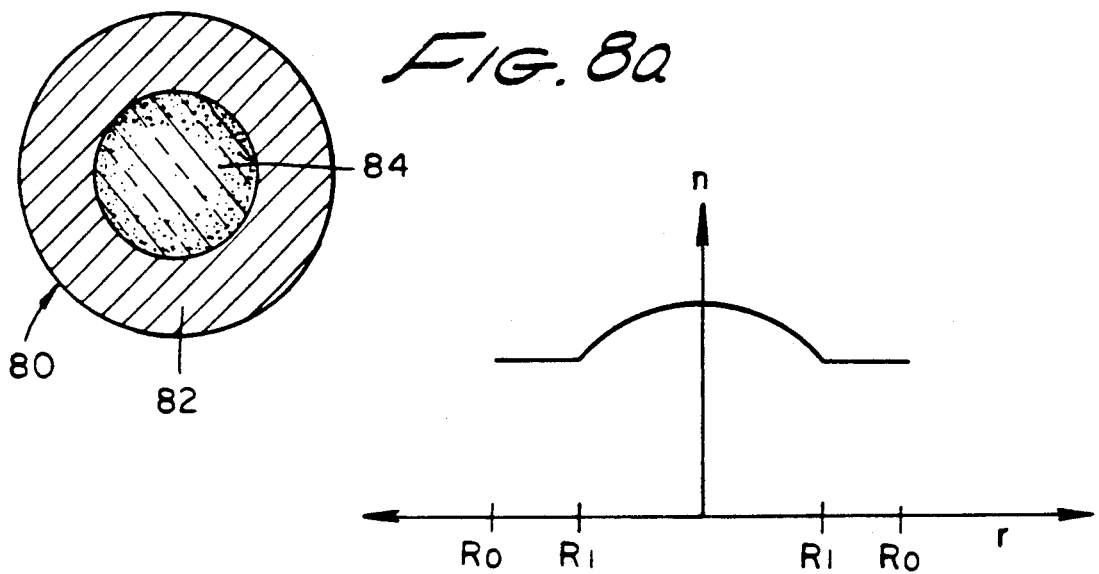
FIG. 8a
FIG. 8b
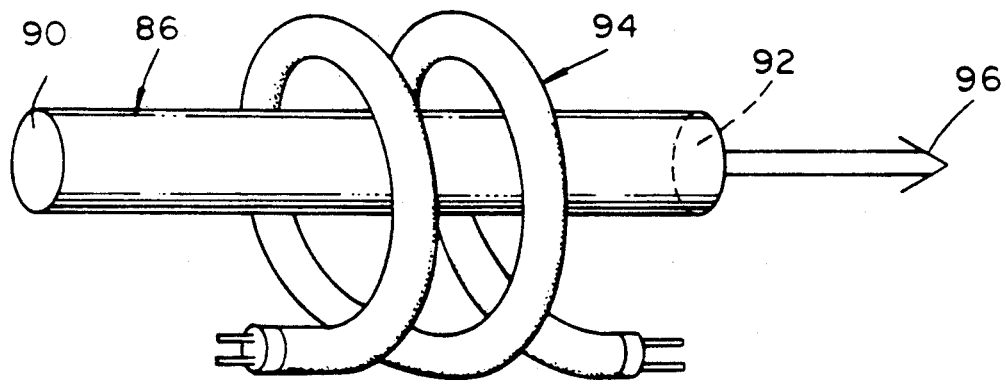
FIG. 9a
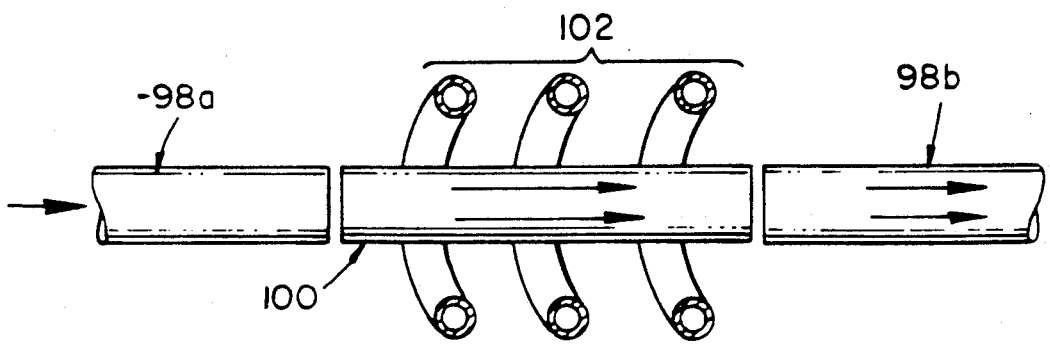
FIG. 9b

METHOD OF CLADDING SINGLE CRYSTAL OPTICAL FIBER

This application is a division of U.S. patent application Ser. No. 07/186,045, filed Apr. 25, 1988 now U.S. Pat. No. 5,037,181.

BACKGROUND OF THE INVENTION

1. Field of the Invention

This invention relates to single crystal optical fibers and in particular relates to claddings for, and apparatus and methods for cladding, single crystal fibers enabling low-loss single mode operation, and to devices incorporating clad, single crystal optical fibers.

2. Background of the Invention

The need for cladding optical fibers is well known. Cladding materials reduce optical losses and other deleterious effects in commercial glass and other vitreous fibers. The cladding surrounds the glass fiber core, the portion which guides propagating light waves, with a material having a slightly lower index of refraction than the core. The cladding isolates the core from the outside world and reduces scattering losses along the fiber length.

Glass fibers are generally produced in a pulling process. In this process, a relatively large glass preform, comprising a cylinder of core glass surrounded by the lower index cladding glass, is melted and pulled into a very fine, glass-clad fiber. The process creates a smooth core/cladding interface, insuring very low losses for light traveling through the core. These clad glass fibers are used routinely in transcontinental communications because of their extremely low losses and because the core size can be made so small that only a single mode of light may traverse its length.

Materials other than glass, however, are also being considered for optical fibers. In particular, single crystal optical fibers, meaning fibers grown from a single crystal and having definite crystal planes, show attractive properties which distinguish them from conventional glass fibers. For instance, neodymium YAG (yttrium aluminum garnet)(Nd:YAG) crystals can be formed into both rods and thin fibers. In both forms, the crystal material can amplify light and function as a laser. Lithium niobate crystals exhibit strong electro- and acousto-optical properties. With a proper cladding, such crystals would be useful in fiberoptic devices such as phase and amplitude modulators, acousto-optic modulators, Bragg reflectors, frequency shifters, second harmonic generators, parametric amplifiers and oscillators. In such single crystal fiber devices, though, a lack of suitable cladding impairs their operation.

A low-index cladding for crystal fibers would allow fewer light modes to be guided and would greatly reduce scattering losses. Fiber lasers without cladding require very high pump energies; electro and acousto-optic fiber devices lose much of their light before they can alter it. Single crystal fibers, being grown rather than "pulled", exhibit a relatively large degree of surface irregularities. These irregularities are primarily due to diameter variations along the fiber length, are not found in glass fibers and contribute heavily to the crystal fiber losses.

Single crystal fibers are grown using a laser-heated, crucibleless, pedestal growth apparatus. In such an apparatus, the upper end of a source rod of the crystal material, e.g., Nd:YAG or Lithium niobate, is heated with a focused laser beam. Once the laser beam melts the upper end of the source rod, the lower end of a crystallographically oriented seed rod is dipped into the molten material. The single crystal fiber is then grown by raising the lower source rod at a rate which maintains its upper end in the beam of the heating laser while simultaneously raising the upper seed rod at an even faster rate, drawing the single crystal fiber from the molten material.

Growing such a single crystal fiber differs from the viscous drawing of a glass fiber since, unlike glass, a melting or growing rod of crystalline material has a definite location along its length at which a liquid-to-solid phase transition occurs. There are two liquid/solid interfaces present during growth of a single crystal fiber, one interface at the end of the source rod and another along the growing fiber. Between these two interfaces, there exists a region of truly molten material supported by the surface tension of the liquid material. As the single crystal fiber grows, minute variations in the growth parameters, such as the translation rates and the liquid temperature, cause the diameter of the growing fiber to vary. These diameter variations cause the surface of the single crystal fiber to be rough.

Lithium niobate fibers made by these methods exhibit a rough surface attributable in part to diameter variations, and in part to condensation of gaseous material upon the fiber surface during growth. Such irregularities cause further undesirable scattering of light in the fibers.

Because single crystal fibers are grow from seed crystals and not pulled from a vitreous melt, they cannot be clad in the same way as amorphous glass fibers. One research group attempted to clad Nd:YAG fibers by coating a fiber with a glass frit, which is a layer of ground glass applied like a paint and then baked. The result was an uneven cladding that was inflexible and functioned poorly. We are not aware that anyone has disclosed a suitable cladding for lithium niobate.

Simple, reliable claddings, and methods for making such claddings for grown single crystal fibers would permit the manufacture of many new crystal fiberoptic devices, useful in a variety of laboratory and commercial settings.

SUMMARY OF THE INVENTION

The present invention provides claddings for, and methods and apparatus for cladding, single crystal fibers which are useful in crystal fiberoptic devices having low-loss single mode operation.

This invention provides several different claddings for single crystal fibers. The preferred cladding depends in part upon the nature of the fiber material. The product of one embodiment of the invention is a neodymium YAG crystal fiber core surrounded by a glass layer. The glass layer has an index of refraction different from that of the Nd:YAG fiber such that optical waves are guided through the core. With proper refractive indexes for the glass cladding, preferably 0.05 to 0.001 less than the core, and a fiber core small enough, the fiber will guide a small number of optical modes and preferably only one optical mode. Neodymium YAG crystal fibers have a refractive index of approximately 1.818. Metal doped glasses exist which have indexes sufficiently large to match the YAG fibers. The problem has been in applying the glass to the fiber uniformly. For Nd:YAG fibers, the methods and apparatus of the present invention apply such glasses to form glass-clad single crystal optical fibers.

In one embodiment of the invention, the Nd:YAG fiber is suspended in a trough made of a dimensionally stable material such as fused silica and treated with a mold release compound. Glass is then melted within the trough around the fiber. After cooling, the glass-clad Neodymium fiber is removed from the trough ready for use To minimize thermal stresses and damage, the trough can be formed in a YAG rod so that the final product includes a larger outer rod made of the same material as the inner fiber.

In another embodiment, the Nd:YAG fiber may be drawn through a small opening in the bottom of a quartz crucible surrounded by uniform heating elements. The crucible contains a supply of molten glass whose surface tension is maintained by the opening at the crucible bottom. The size of the opening is based upon the desired cladding thickness and the diameter of the fiber to be clad. Accordingly, the size of the opening is sufficiently large to extrude a cladding of desired thickness along the surface of the fiber.

For lithium niobate fibers, there is no known kind of glass with a sufficiently high refractive index to reduce optical losses through cladding. Accordingly, the present invention provides a lithium niobate single crystal fiber whose outer region is comprised of the same material as the fiber core, modified with a small added amount of dopant material. As used herein, the term "dopant material" means a substance that can infuse into the fiber material to form a substance with a lower index or indices of refraction. This outer doped region has ordinary and extraordinary indices of refraction smaller than the core and thereby provides a cladding capable of guiding optical waves through the fiber. With a proper difference in refractive indices and with a small enough core, the product is a single mode single crystal fiber formed from solid lithium niobate.

To provide this intrinsic cladding for lithium niobate single crystal fibers, and to produce other desirable effects, this invention provides methods for diffusing dopant materials inwardly along the length of the fiber. In one embodiment of these methods, the fiber is first annealed in an alumina tube furnace having a dry oxygen atmosphere to reduce the surface granularity of and relieve the stress within the fiber. In another embodiment, the surface granules are dissolved in warm water.

After the fiber is annealed and the surface granularity has been reduced, the fiber is coated with a layer of magnesium oxide. Then the fiber is baked in an alumina tube furnace for a time and at a temperature sufficient to diffuse the magnesium oxide into the fiber crystal lattice. The dopant slightly lowers both the ordinary and extraordinary indices of refraction of the fiber sufficiently to minimize scattering losses, providing a cladding.

Since the cladding is substantially the same material as the core, with substantially the same coefficient of expansion, the cladding exerts minimal stress upon the fiber. In effect, the process shrinks the core size of the lithium niobate fiber by converting an outer region of the fiber into the lower index cladding, allowing the fiber to be used as a single mode optical fiber component, and allowing greater intensity of light at the center of the core.

Depending on the diffusion time for the magnesium oxide dopant, two distinct types of claddings can be formed around the fiber. The first cladding provides a gradient of magnesium oxide concentration, which increase radially from the center of the fiber. Thus the change of refractive index varies in a gradient outward from the fiber core. The first type will be referred to as the graded-index cladding. The second cladding, resulting from longer diffusion time, is a magnesium-rich lithium niobate composite material having a uniform magnesium oxide concentration and a uniform index of refraction along the fiber radius. This second type of cladding may be referred to as a step-index cladding, since this cladding has a sharp boundary between the lower and higher index regions.

Depending on a variety of conditions, including the composition of the lithium niobate fiber, and the temperature and time for diffusion, several possible fiber-cladding configurations may be obtained. A fiber may be clad by either of the two cladding types separately. Or the two claddings can be superimposed, yielding a fiber core surrounded first by a graded-index cladding and then by a step index cladding.

The clad fibers of the present invention can be used in a variety of optical devices. The Nd:YAG clad fibers allow the fabrication of efficient and useful inline fiber-optic lasers and amplifiers, which are useful in commercial transmission circuitry and in fiber-optic sagnac effect sensors.

The clad lithium niobate fiber is useful in fiber-optic devices such as electro-optical phase and amplitude modulators, acousto-optic frequency modulators, rare-earth doped laser and second harmonic components such as frequency adders and doublers. Further, by combining several of these components, such as a fiber-optic laser with a fiber-optic modulator, one can fabricate in-line fiber-optic Q-switched and mode-locked laser sources for fiber-optic systems.

BRIEF DESCRIPTION OF THE DRAWINGS

The present invention may be better understood through reference to the following figures:

FIG. 1a is a cut-away view of an embodiment of a trough apparatus for cladding Neodymium YAG fibers with glass.

FIG. 1b is a cross-sectional view of the apparatus of FIG. 1b taken on line 2—2 of FIG. 1a.

FIG. 2a is a cross-sectional view of a glass-clad fiber.

FIG. 5 is a diagram of an evaporative coater for depositing a dopant coating upon a single crystal fiber.

FIG. 6 is a cross-section of a single crystal fiber coated with a dopant material.

FIG. 7a is a cross-section of a single crystal fiber with dopant material diffused into the fiber, forming an outer cladding of graded refractive index.

FIG. 7b is a graph of the refractive index profile of a single crystal fiber having dopant diffused into its outer region.

FIG. 8a is a cross-section of a single crystal fiber with dopant material diffused into the fiber, forming an outer cladding of uniform refractive index.

FIG. 8b is a graph of the refractive index profile of the single crystal fiber of FIG. 8a having dopant diffused into its outer region.

FIG. 9a shows a single crystal laser comprising a single crystal fiber and light pumping means.

FIG. 9b shows a single crystal light amplifier incorporated into a fiber-optic system.

DESCRIPTION OF A PREFERRED EMBODIMENT

Figure 2B:
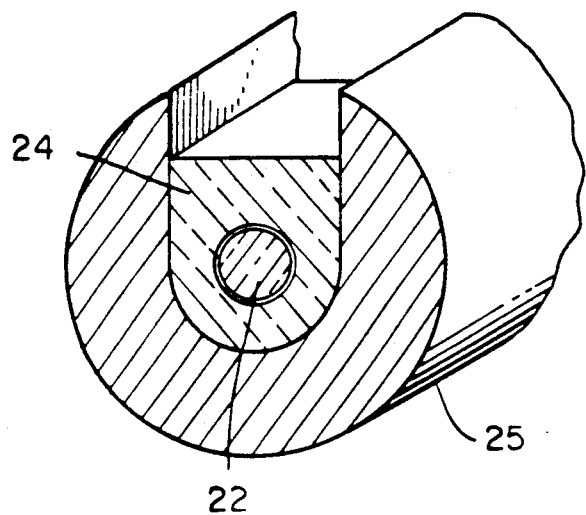
FIG. 2b is a cross-sectional view of a glass-clad fiber surrounded by a larger rod.

In single crystal fibers such as neodymium:YAG the diameter variations in the grown fibers create surface roughness leading to many deleterious optical effects. These effects include the conversion of light initially propagating in one mode into other undesired propagation modes, and the loss of light through scattering at the surface of the fiber. The severity of the effects depends upon the difference between the indices of refraction of the fiber and that of the material contiguous to, or adjacent to the rough outer surface of the fiber. If there is a large difference in indices and substantial surface roughness in the fiber, then a large number of modes of light can exist within the fiber. If the fiber were to be used as an optical amplifier or laser, the large number of modes would significantly reduce the optical gain for the device's fundamental mode. In addition, a large amount of light would be scattered at the fiber surface.

As shown in FIGS. 1a and 1b, one method for cladding a single crystal fiber with high index glass employs a linear, U-shaped trough 12 formed along the length of a cylindrical rod 17 of YAG or quartz as a mold into which the molten glass flows. To clad a fiber, the rod 17 is positioned in a V-shaped groove 11 of jig 16, with the open end of the U-shaped trough 12 facing upward. The jig 16 is also fitted with a second pair of V-shaped grooves 13 and 15 for receiving the ends of the single crystal fiber 14.

The fiber 14 is held suspended in and parallel to the trough 12 by the clamping caps 18 and 20, which have V-shaped projections on their bottom sides. These projections mate with the V-shaped grooves 13 and 15 and hold the fiber 14 firmly in place. After the fiber is positioned in trough 12, small pieces of glass material are placed within the U-shaped trough 12 around and along the length of fiber 14.

Preferably the glass has a refractive index close to, but different from that of the single crystal fiber. One glass material used with success is LaSF30 Schott glass, with a refractive index of 1.7834. Subtracting its index from that of Nd:YAG, or 1.8180, yields an index difference of 0.0346. Preferably, the index difference should be in the range from about 0.05 to about 0.001. It often improves the final cladding if the glass pieces are polished before melting. The polishing reduces tiny bubbles formed around the glass pieces, resulting in a more uniform cladding around the fiber.

After placing the glass in the trough, the entire assembly 10, i.e. the jig 16, the rod 17, the fiber 14 and the glass, is heated to approximately 600 degrees centigrade. At 600° C. the glass material melts and flows within the U-shaped trough to surround and clad the single crystal fiber. Upon cooling, the glass material solidifies, adhering to the surface of the fiber 14.

As mentioned, the rod 17 and its trough 12 can be made of different materials. If the trough 12 is formed in a quartz rod, then the interior of the trough may be coated with an aerosol carbon mold release compound before positioning the single crystal fiber within the trough. Then, upon cooling the melted glass, the clad fiber as shown in FIG. 2a may be removed from the U-shaped trough. The fiber core 22 is surrounded by the glass cladding 24.

If the trough 12 is formed in YAG material, the single crystal fiber, the high refractive index glass and the YAG rod bond into one solid piece of composite material, as shown in FIG. 2b. In this embodiment, the much larger YAG rod 25 reduces mechanical stress upon the single crystal fiber 22. Such stress may arise from a difference in expansion coefficients between the single crystal fiber 22 and the glass cladding 24.

Figure 3:
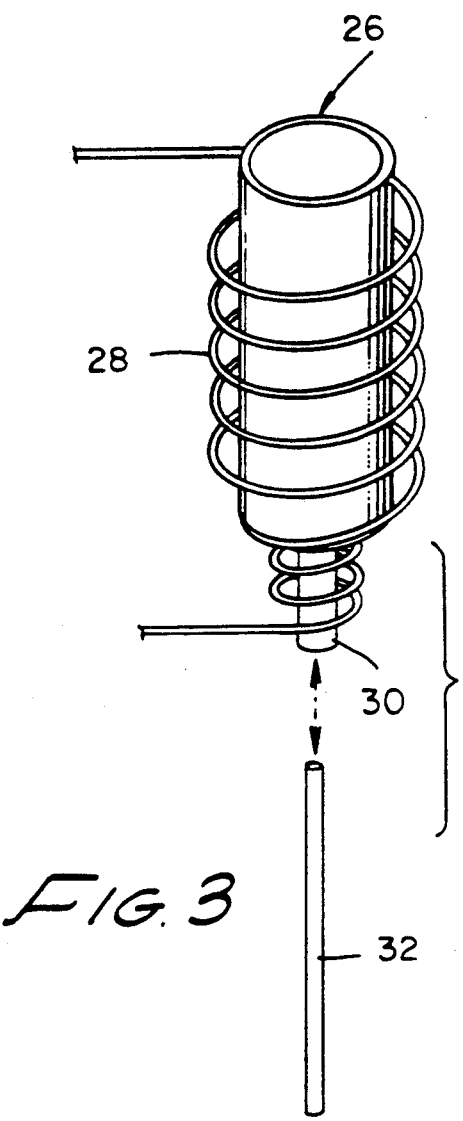
FIG. 3 shows an embodiment of a crucible apparatus for cladding Neodymium:YAG fibers with glass.

FIG. 3 shows another embodiment of the apparatus of the present invention. There, a single crystal fiber is dipped into a bath of molten glass having an index of refraction sufficient for a cladding. The bath is held by a crucible 26 having a funnel shaped tube 30 projecting downwardly from the body of the crucible. The funnel has a sufficiently small inner diameter that the surface tension of the molten glass prevents glass flow from the crucible. Heating elements 28 surrounding the quartz crucible uniformly heat the high refractive index glass.

To clad a single crystal fiber using this apparatus, one end of the fiber 32 is inserted upward into the funnel-shaped tube 30 of the crucible 26. After almost the entire length of the fiber has been inserted upward into the crucible, the fiber is withdrawn downward, coating the single crystal fiber with a uniform glass cladding. Alternatively, the fiber can be passed down through the crucible and pulled out of the tube 30.

Many other single crystal fibers, such as lithium niobate fibers, have a refractive index too high to use any available high-index glasses. Instead of coating the crystal fiber with a glass layer, a cladding can be formed within the fiber by diffusing a dopant into the fiber crystal structure. This method forms a cladding comprised primarily of the same material as the fiber core, resulting in a sturdy, flexible device with little induced stress. The diffusion method produces a cladding where both the ordinary and the extraordinary indices of refraction of the cladding are lower than the corresponding indices of the fiber core. The cladding uniformly confines propagating light within the fiber regardless of polarization and the orientation of the crystal planes of the fiber. This method also effectively reduces the core of the fiber, providing a core size smaller than that available from the grown fibers.

To relieve stresses induced during growth of fibers, to reduce fiber brittleness, and to ensure uniformity of diffusion by eliminating undesired surface irregularities in the lithium niobate fiber, the fiber is preferably annealed before undergoing the diffusion process. The surface irregularities apparently are granules of $Li_2O$ that evaporate from the molten zone during fiber growth and condense onto the cooler sections of the fiber. The granules can adversely affect, by slowing or quickening, the diffusion process, resulting in an uneven cladding.

Figure 4:
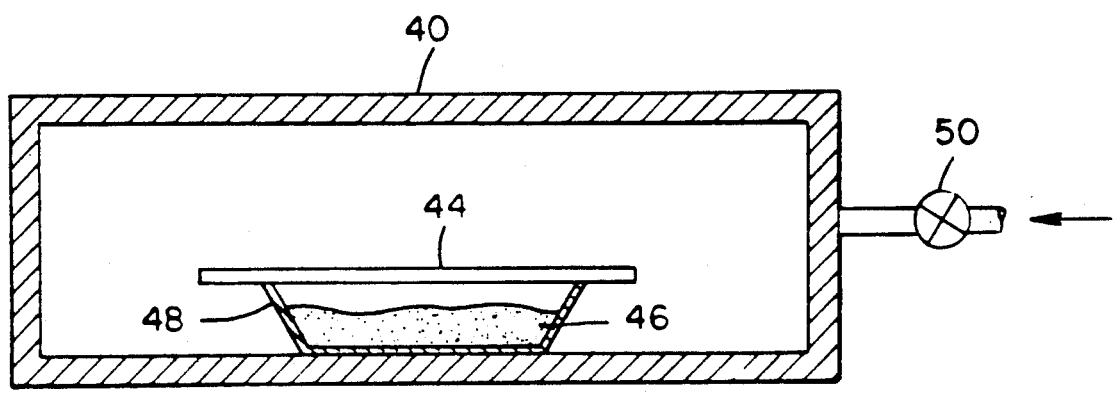
FIG. 4 shows an embodiment of the apparatus used for annealing lithium niobate fibers and for diffusing the magnesium oxide dopant into the fibers.

FIG. 4 shows one apparatus for annealing the crystal fibers. In this apparatus, fiber 44 is placed within an alumina tube furnace 40 and held suspended on the edges of a platinum foil trough 48. The gaseous environment in the tube should be primarily dry $O_2$ that can be supplied through valved inlet 50. The $O_2$ environment minimizes the loss of oxygen from the fiber. Such losses undesirably reduce fiber transparency, instead promoting formation of a brownish coloration. Additionally, a lithium-rich lithium niobate powder 46 is preferably placed in tray 48 within alumina tube furnace 40 to replenish any lithium which diffuses from fiber 44 during heating.

A typical annealing cycle increases the temperature of the alumina furnace and fiber linearly from 50 degrees centigrade to approximately 1050 degrees centigrade in one hour. The temperature is maintained at 1050 degrees for two hours and is then reduced to 570 degrees centigrade linearly in one hour. After this, the fiber is cooled to room temperature.

Another method for eliminating granules on the surface of a lithium niobate fiber comprises dipping the fiber into a bath of warm water, preferably at a bath temperature in the range of approximately 50 to about 100 degrees centigrade, until the granules dissolve. This method could be used in conjunction with the annealing step to relieve stress in the fiber and to reduce its surface granularity.

After relieving stress in the fiber and reducing its surface granularity, the preferred cladding method comprises depositing a layer of dopant material on the surface of the fiber. For lithium niobate the preferred dopant material is magnesium oxide (MgO). The deposition can be performed in a standard evaporative coater, such as those used for optical coatings, as shown in FIG. 5. Coater 60 contains a rotating chuck 62. Chuck 62 holds glass capillary tube 64, which in turn holds fiber 66. Fiber 66 spins suspended over the MgO evaporative source 68, which may comprise an electron beam or other evaporation deposition device. Turning the fiber ensures a uniform deposition.

The desired thickness of the MgO layer depends on the fiber diameter. A certain amount of MgO is required to diffuse inwardly, forming the cladding layer. An additional amount is needed to ensure that the diffusion process has a constant source, i.e. a source which does not deplete during processing. Preferably the deposited MgO layer is about 0.6 micron for a 170 micron diameter fiber, and about 0.2 micron for a 50 micron fiber. The resulting coated fiber 70, shown in FIG. 6, includes LiNbO$_3$ fiber 72 surrounded by a magnesium oxide coating layer 74.

After a fiber is coated with dopant material such as magnesium oxide, the dopant is diffused into the fiber during a second thermal cycle. The coated fiber is placed in the oven as shown in FIG. 4, and the temperature is raised uniformly from 50 degrees C. to about 1050 degrees C. in one hour, then is held at about 1050 degrees C. for a diffusion time $T_D$. The diffusion time depends on the desired diffusion depth. For a 24 micron diffusion depth in thick fibers, 40 hours is a sufficient time. The approximate diffusion time can be calculated for different temperatures and thicknesses using the diffusion coefficients given in an article by J. Noda, et al, in the Journal of Applied Physics, Vol. 49, p. 3150, published in 1978. For diffusion depths comparable to the fiber radius, diffusion occurs more rapidly due to the round geometry. After time $T_D$, the fiber is cooled uniformly to 570° C. in one hour, then subsequently cooled to room temperature.

FIGS. 7a and 7b show the doped crystal fiber. FIG. 7a shows the fiber in cross section, the shading indicating the relative concentrations of the magnesium oxide dopant. The magnesium oxide reduces both the ordinary and extraordinary indices of refraction of the lithium niobate material in proportion to the MgO concentration. An index profile, applicable to both indices of refraction, across the diameter of the fiber is shown in FIG. 7b. The indices vary approximately parabolically, decreasing along the radius of the fiber outwardly from the center of the fiber to the maximum radius $R_0$.

It is believed that the MgO concentrations within the fiber should be between 1 and 8 mole percent (1 mole percent being 0.01 moles of MgO to 1 mole of lithium niobate) to obtain the graded-index type of cladding. Concentrations of MgO of less than 1 mole percent appear to change the refractive index less than 0.001, creating a poor cladding. The change in refractive index for the ordinary polarization due to the MgO dopant within the lithium niobate crystal is approximately 0.0018 for 1 mole percent MgO.

It has been discovered, in a variation to the invention, that concentrations of MgO greater than 8 mole percent cause a phase separation in the lithium niobate material, resulting in a step-index type of cladding. The solubility limit of magnesium oxide in lithium niobate varies from about 7.2 to 8.0 mole-percent. Near the magnesium oxide diffusion layer, the magnesium oxide concentration is radially uniform and much higher, approximately equal to 20 mole-percent. The result is an outer magnesium-rich layer of nearly uniform refractive index of 2.08. This uniform-index layer will either surround or replace the graded-index interior caused by the linear diffusion of the magnesium into the fiber's core.

Table 1 illustrates the variation of the thickness of the outer magnesium-rich layer with diffusion time. The example used a 170 micrometer diameter lithium niobate fiber initially doped with 5% magnesium oxide throughout. (Such a pre-doping of the fiber can be used to accentuate the formation of the magnesium-rich step-index layer and also to reduce the photorefractive damage threshold of the fiber). The layer thickness of Table 1 exhibits a linear dependence on diffusion time, rather than a square root dependence that is typical of a linear diffusion process. The magnesium-rich layer formation is highly dependent on the lithium concentration in the fiber. Thus, the higher the lithium concentration, the lower the percentage of magnesium required for a phase-separation. To obtain a magnesium-rich cladding layer, the fibers should be suspended over a boat of lithium rich powder during annealing and during diffusion.

TABLE 1

| Mg-rich Layer Thicknesses for 170 micron LiNbO$_3$ fiber ||
| DIFFUSION TIME | MG-RICH LAYER THICKNESS |
| --- | --- |
| 10 Hours | 2 microns |
| 20 Hours | 5 microns |
| 30 Hours | 7 microns |
| 40 Hours | 9 microns |

TABLE 1-continued

Mg-rich Layer Thicknesses for 170 micron LiNbO₃ fiber

| DIFFUSION TIME | MG-RICH LAYER THICKNESS |
|---|---|
| 60 Hours | 16 microns |

The resulting refractive index profile is a step function like that of most commercial silica fibers. The index profile is shown in FIGS. 8a and 8b. Within fiber 80, an outer magnesium-rich layer 82 surrounds inner core region 84. The inner core region 84 extends from the center of the fiber to a radius $R_1$ and possesses a parabolic refractive index profile as seen in FIG. 8b. The magnesium-rich layer extends from radius $R_1$ to the outer fiber radius $R_0$ and has a uniform refractive index, regardless of crystal orientation.

Certain trade-offs occur with the use of the magnesium-rich step-index layer. Too thin (less than about 5% of the fiber diameter) of a cladding layer can crack off. Too thick (greater than about 90% of the fiber diameter) of a layer can stress the fiber core to the point where the core cracks. One suitable design comprises a 60 micron lithium niobate fiber, where the magnesium rich layer is 15 microns deep, leaving a 30 micron core. Usually, the step-index layer will be created together with the graded magnesium-diffused (or parabolic) profile already discussed, providing an efficient clad single crystal fiber with a small core size.

Various modifications can be made to the lithium niobate cladding methods. Surface granularity in the fibers can be minimized by changing the growth direction of the fiber so that the source material is above the molten zone rather than below. Evaporating lithium dioxide material would then tend not to condense upon the growing fiber. Different MgO thicknesses may be used to vary the depth, profile shape and maximum refractive index change.

Different furnaces can be used for the annealing and diffusion steps. A quartz furnace may be used provided the fiber does not touch the walls, otherwise the fiber can become white or cloudy. In addition, different powder compositions may be used to arrive at a desired dopant concentration in the fiber. Instead of lithium-rich lithium niobate powder, a congruent powder having the same stoichiometry as the fiber may be used. Or, instead, a lithium-poor powder may be used, to diffuse more of the lithium out of the fiber if desired. The temperatures imposed upon the coated fiber may increase or decrease the MgO diffusion rates into the fiber. The temperature should not, however, exceed the Curie point of the lithium niobate. Above the Curie point, the material loses its ferro-electric domain structure, eliminating its many useful electro-optical properties. The Curie temperature occurs in the range from about 1100° C. to about 1200° C. depending upon the lithium niobate composition.

The single crystal fibers, clad through one of the methods of the present invention, find use in a variety of novel fiber-optic devices. Using either external light excitation sources, or another light wave launched into the fiber, the clad Nd:YAG fibers can form fiber-optic amplifiers and lasers. Such devices are illustrated in FIGS. 9a and 9b. FIG. 9a illustrates a simple fiber-optic Nd:YAG laser 86, having a clad Nd:YAG fiber 88 with mirrored ends 90 and 92 and surrounded by a flash lamp or other appropriate optical pumping means 94. Alternatively, end pumping may be employed. Laser light 96 then emerges from one end, highly collimated for launching into a fiber-optic system.

FIG. 9b shows an in-line optical amplifier comprising a Nd:YAG clad fiber 100 surrounded by flash lamps 102 (or again, incorporating other appropriate optical pumping means) and butt-coupled between two optical fibers 98a and 98b. Light entering the device through fiber 98a is amplified coherently and exits through fiber 98b much stronger than when it entered. By using such an in-line optical amplifier, communication signals can be efficiently repeated over long distances.

A great number of devices can be formed out of clad Lithium niobate fibers. By doping clad LiNbO₃ fibers with rare-earth elements such as Erbium or Neodymium, various fiber lasers can be formed, all benefiting from cladding the fiber to provide low losses. In addition, a variety of optical modulators can be formed by exploiting the lithium niobate's electro-optic and acousto-optic properties. Electrodes placed around the perimeter of the fiber allow the application of electric fields to the fiber crystal.

Figure 10A:
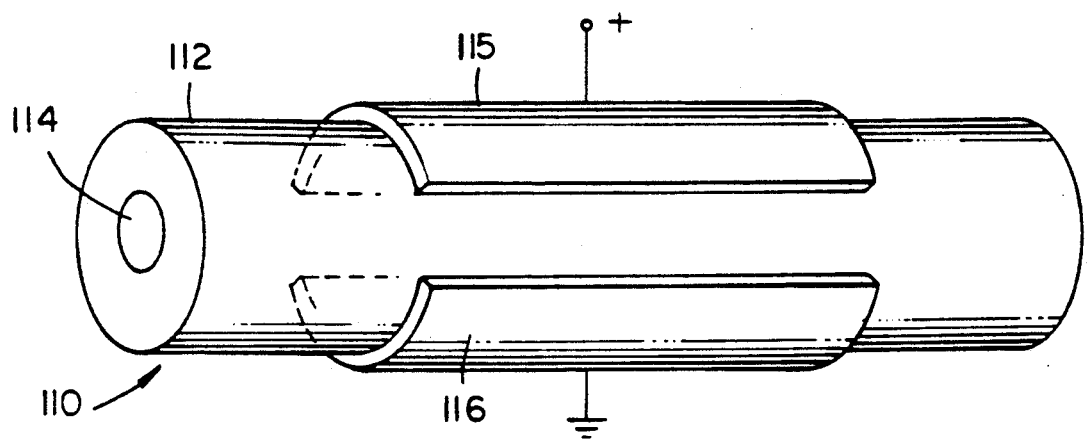
FIG. 10a shows a clad single crystal fiber with opposing electrodes.
Figure 10B:
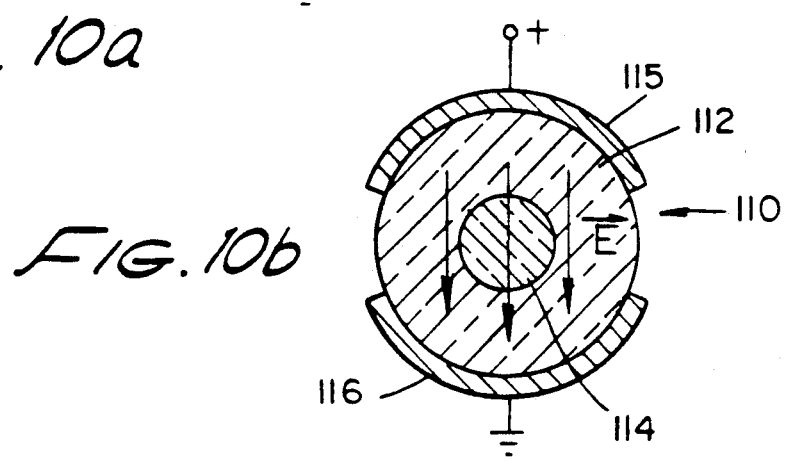
FIG. 10b shows the clad fiber of FIG. 10a in cross-section, with the electric field lines superimposed.

FIGS. 10a,b and 10c,d illustrate two distinct electrode geometries. FIGS. 10a, 10b illustrate an electrode pattern which provides an electric field transverse to the crystal fiber. A lithium niobate fiber 110 comprising fiber core 114 and fiber cladding 112 has two opposing electrodes 115 and 116 deposited on either side. The electric field lines are illustrated in FIG. 10b. Depending on the frequency of electrical voltage applied, the fiber's electro-optic effects (variations in refractive index due to applied electrical fields) can phase or amplitude modulate the light traversing the fiber.

Figure 11:
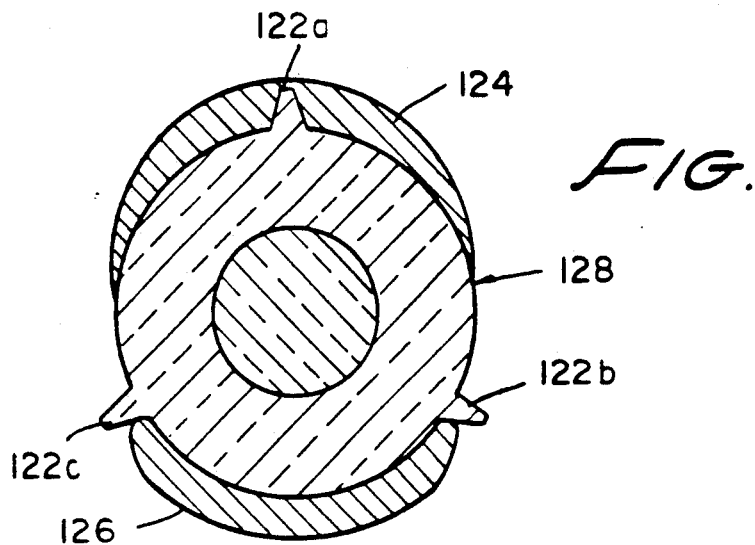
FIG. 11 is a cross-sectional view of a c-axis lithium niobate crystal fiber, having three exterior ridges and electrode deposits on opposing sides.
Figure 12:
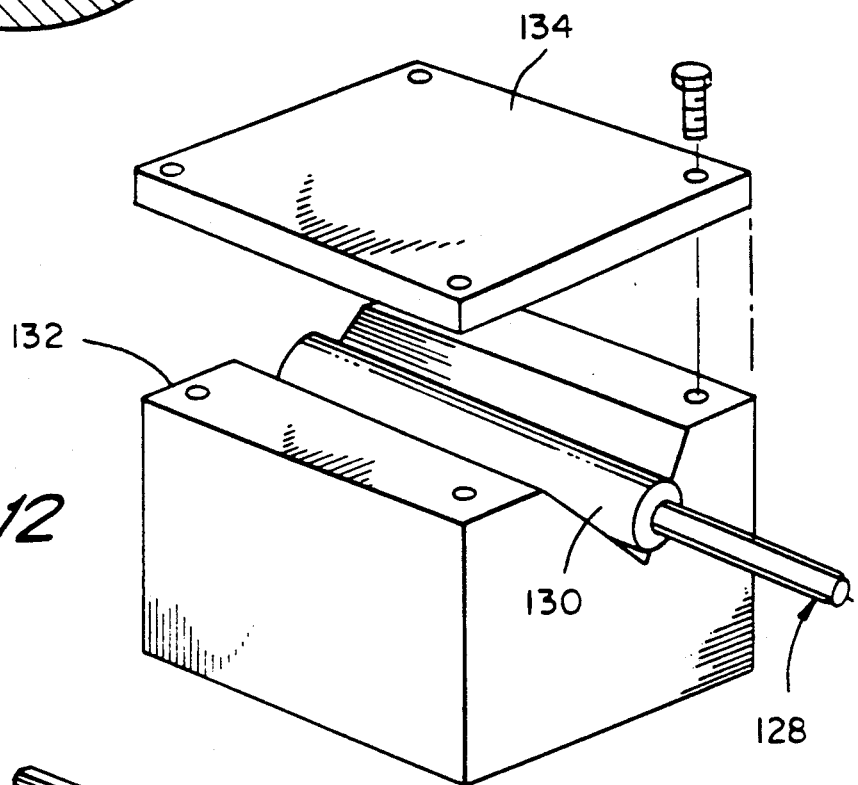
FIG. 12 shows apparatus for coating a lithium niobate single crystal fiber with electrodes.
Figure 13:
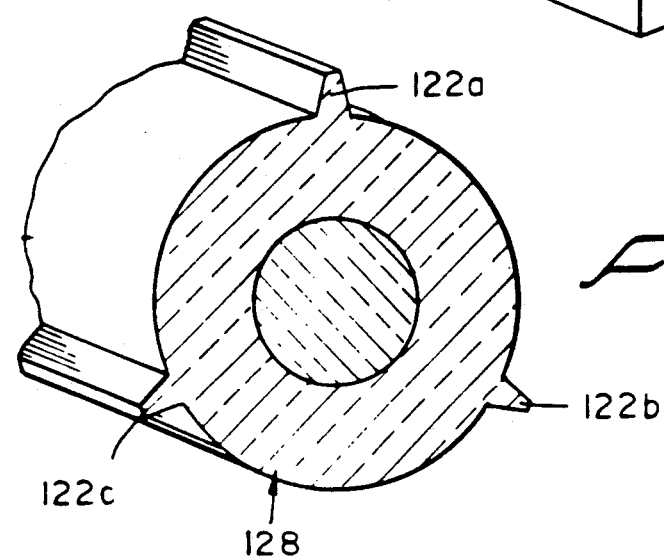
FIG. 13 is a enlarged cross-sectional view of the lithium niobate fiber of FIG. 12.

One technique for applying the transverse type of electrodes to the fiber involves holding the fiber suspended over an evaporation source of gold or other suitable electrode material. The evaporated material rises and deposits on the surface of the fiber facing the crucible. Because c-axis lithium niobate fiber has three longitudinal ridges 122a,b, and c, as seen in FIG. 11, it is necessary to properly orient the fiber before depositing the metal, to avoid creating three instead of two electrodes. As shown in FIG. 12, the fiber 128 is first inserted into a capillary tube 130 and cemented with alumina bond. The capillary 130 is then placed in a V-groove of an aluminum holder 132, with the fiber protruding. Rotating the capillary tube by hand while observing it under a microscope, one ridge (FIG. 11) is located such that a gold electrode 124 will be deposited centered on that ridge, and another gold electrode 126 will be deposited oppposite it between the two other ridges of the fiber surface. The capillary tube is secured into place with a second aluminum piece 134 screwed onto the first aluminum piece.

Chromium and then gold are deposited in a vacuum chamber, using E-beam evaporation. After a first deposition, the holder is rotated 180° without moving the fiber. Then a second deposition is made. A typical deposition thickness includes a first layer of 100 angstroms of chromium for adhesion, followed by a 2 micron layer of gold. Due to a finite divergence of the evaporating beam, some metal is also deposited on the portions of the fiber located between the electrodes. These interelectrode layers are thinner, however, than the electrodes themselves and can be removed by use of a chemical etchant.

The gold etchant used consists of a solution of potassium iodide and iodine in water (100 gms KI, 100 gms I₂ and 200 ml H₂O). The chromium etchant was composed of cerium sulfate, nitric acid and water (27 gms $H_4Ce(SO_4)_4$, 100 ml $HNO_3$, 400 ml $H_2O$). The etching method depends upon a complete removal of the interelectrode or excess metal while simultaneously avoiding an excessive etching of the electrodes themselves. The metal-removal time is an important parameter. By diluting the gold etchant solution in water 1:20, the etching time for a fiber was found to be 25 seconds in the diluted gold etchant, followed by 20 seconds in the chrome etchant.

After etching, the fiber is immersed in deionized water to remove the excess etchant. The immersion time in the chrome etchant appears less important since the chrome underneath the gold electrodes is protected by the gold itself. The result is an opposing electrode pattern on the surface of the fiber, able to provide the electro-optical effects described above.

Figure 10C:
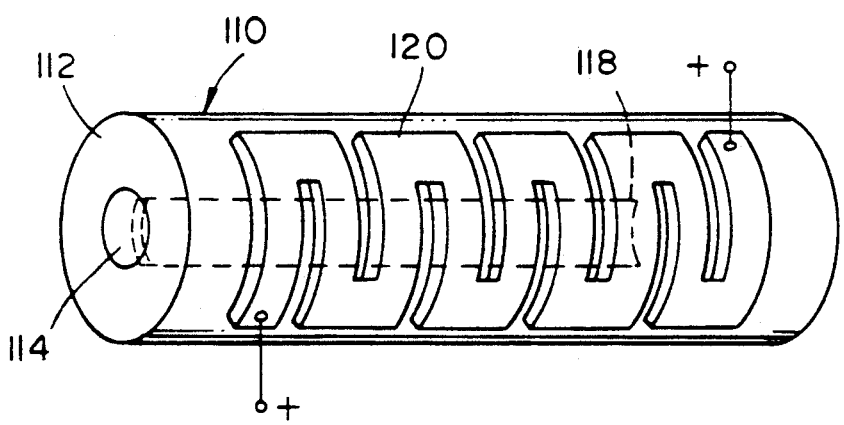
FIG. 10c shows a clad single crystal fiber with electrodes looping on the surface of the fiber to create a succession of individual electrode pairs.
Figure 10D:
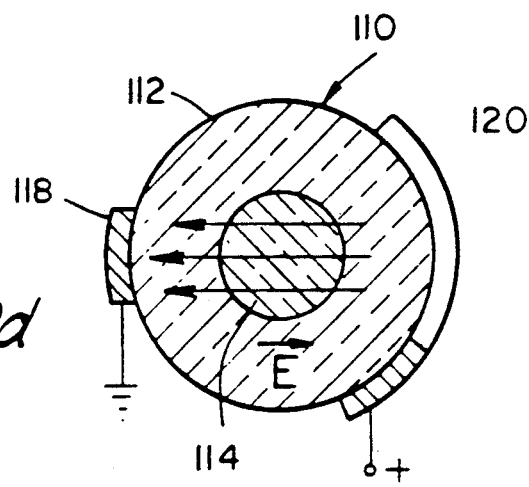
FIG. 10d is a cross-section of the clad fiber of FIG. 10c, also showing one pair of electrodes and the superimposed electric field lines.

The electrode pattern of FIG. 10c can provide regularly spaced electrical fields which cause an acousto-optic effect: the production of longitudinal acoustic waves within the fiber which alter the fiber's indices of refraction. The result is an acousto-optic light modulator, capable of altering the phase or frequency of the light in the fiber. The electrode pattern of FIG. 10c can be formed through a photo-lithographic process: i.e., sputtering a layer of gold or other electrode material onto the fiber surface and then applying a photoresist layer. The electrode pattern can be defined by photolithographic methods and then etched. The techniques required are described in an article "Switchable fiber-optic tap using acoustic transducers deposited upon the fiber surface" in Optics Letters, Vol. 12, No. 3, March 1987, pps. 208-210. As seen in FIG. 10c and 10d, the fiber 110 has a solid electrode plane 118 on one side of the fiber, and on the other a pattern of fingers 120. The result is a series of discrete electrical elements capable of exciting longitudinal acoustic waves within the fiber.

Some of the uses for clad lithium niobate fibers do not require electrodes. Depending upon the exact composition and orientation of the fiber, the material is capable of second harmonic optical effects at given temperatures. For example, a frequency adder fiber would take two discrete frequencies of light and with proper conditions, add the two frequencies to produce a third higher frequency. One variation of this is a frequency doubler, where a single frequency of light, 1.064 microns for example, enters the fiber, and two discrete frequencies 1.064 microns and 0.532 microns exit.

The methods and apparatus described for cladding single crystal optical fibers may be easily applied to polycrystalline fibers as well as fibers of other material compositions.

What is claimed is:

1. A method of cladding a single crystal fiber comprising the steps of:
   placing said single crystal fiber within a trough;
   holding said fiber substantially parallel to and away from the inside surface of said trough;
   placing glass within said trough;
   heating said glass to a temperature high enough to melt said glass, and for a time sufficient for melted glass to substantially surround and clad said fiber;
   thereafter cooling said fiber and the cladding in said trough to solidify said cladding such that said cladding surrounds and adheres to said fiber and said cladding also adheres to said trough.

2. Method as claimed in claim 1 wherein said single crystal fiber is selected to be Neodymium:YAG.

3. Method as claimed in claim 1 wherein said trough is selected to be formed from fused silica.

4. Method as claimed in claim 1 wherein said trough is selected to have a coefficient of expansion substantially the same as said fiber.

5. Method as claimed in claim 4 wherein said single crystal fiber is selected to be Neodymium:YAG.

6. Method as claimed in claim 4 wherein said trough is selected to be Neodymium:YAG.

7. The method of claim 4 further comprising selecting said melted glass to have a coefficient of expansion substantially the same as said fiber.

8. The method of claim 7 wherein said single crystal fiber is selected to be Neodymium:YAG.

* * * * *

UNITED STATES PATENT AND TRADEMARK OFFICE
CERTIFICATE OF CORRECTION

PATENT NO. : 5,077,087
DATED : December 31, 1991
INVENTOR(S) : Robert L. Byer, et. al.

It is certified that error appears in the above-indentified patent and that said Letters Patent is hereby corrected as shown below:

Column 1, after the title of the invention, and before the paragraph beginning "This application is a division of --", insert the following: --The U.S. Government has rights in the disclosed invention pursuant to Air Force Contract Number F49620-85-C-0062 and ONR Contract Number N00014-84-K-0327 to Stanford University--.

Signed and Sealed this

Twenty-eighth Day of September, 1993

Attest:

BRUCE LEHMAN

Attesting Officer

Commissioner of Patents and Trademarks